(12) United States Patent
Shoji et al.

(10) Patent No.: US 8,271,559 B2
(45) Date of Patent: Sep. 18, 2012

(54) STORAGE SYSTEM AND METHOD OF CONTROLLING SAME

(75) Inventors: Tomoki Shoji, Fujisawa (JP); Takuya Okamoto, Machida (JP); Hidehisa Shitomi, Yokohoma (JP)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 12/865,806

(22) PCT Filed: Jul. 23, 2010

(86) PCT No.: PCT/JP2010/004734
§ 371 (c)(1), (2), (4) Date: Aug. 2, 2010

(87) PCT Pub. No.: WO2012/011158
PCT Pub. Date: Jan. 26, 2012

(65) Prior Publication Data
US 2012/0023146 A1  Jan. 26, 2012

(51) Int. Cl.
*G06F 17/30* (2006.01)
(52) U.S. Cl. ...................................... 707/828
(58) Field of Classification Search ........... 707/828–831
See application file for complete search history.

(56) References Cited

U.S. PATENT DOCUMENTS

| | | |
|---|---|---|
| 7,281,104 B1 | 10/2007 | Tsypliaev et al. |
| 2006/0129537 A1 | 6/2006 | Torii et al. |
| 2006/0212746 A1 | 9/2006 | Amegadzie et al. |
| 2007/0288712 A1* | 12/2007 | Zimoto et al. ............... 711/162 |
| 2008/0168228 A1* | 7/2008 | Carr et al. ................... 711/117 |
| 2008/0183642 A1* | 7/2008 | Akelbein et al. ................ 706/3 |
| 2009/0282209 A1 | 11/2009 | Shimozono et al. |
| 2010/0115008 A1 | 5/2010 | Nakatani et al. |
| 2010/0121828 A1* | 5/2010 | Wang .......................... 707/694 |

FOREIGN PATENT DOCUMENTS

| | | |
|---|---|---|
| JP | 2007-257317 | 10/2007 |
| KP | 2007-94473 | 4/2007 |

OTHER PUBLICATIONS

International Search Report for corresponding PCT Application No. PCT/JP2010/004734, dated Apr. 7, 2011.

* cited by examiner

*Primary Examiner* — Khanh Pham
(74) *Attorney, Agent, or Firm* — Brundidge & Stanger, P.C.

(57) ABSTRACT

Data migration is efficiently executed with optional timing. A file server outputs an instruction to a CPU of a storage apparatus to migrate a file belonging to Tier 1 to Tier 2 when, based on policy information, a condition for migrating the file belonging to Tier 1 to Tier 2 is fulfilled. Based on the instruction from the file server, the CPU copies the data of migration target files in Tier 1 from a page to a Tier 1 virtual page, copies the data which has been copied to the Tier 1 virtual page 114 to a Tier 2 virtual page, copies the data which has been copied to the Tier 2 virtual page to any page in Tier 2, and then overwrites and releases the Tier 1 and Tier 2 virtual pages, and migrates files belonging to Tier 1 to Tier 2.

13 Claims, 13 Drawing Sheets

FIG.3

| FILE NAME | LEADING BLOCK |
|---|---|
| FILE A | BLOCK A1 |
| FILE B | BLOCK B1 |
| | |

FIG.7

| SAVED INFORMATION | DESCRIPTION OF SAVED INFORMATION |
|---|---|
| ARCHIVE STORAGE IDENTIFICATION INFORMATION | IP ADDRESS OF ARCHIVE STORAGE (NODE1) |
| NAME SPACE IDENTIFICATION INFORMATION | NAME SPACE OF FILE MIGRATION DESTINATION |
| FILE IDENTIFICATION INFORMATION | FILE PATH IN NAME SPACE |

STORAGE SYSTEM AND METHOD OF CONTROLLING SAME

TECHNICAL FIELD

The present invention relates to a storage system for managing, as file-system data storage areas, a plurality of physical volumes that are hierarchized in a plurality of tiers, and a method of controlling the storage system.

BACKGROUND ART

In recent years, as a storage system for efficiently operating storage areas in a simple configuration, a storage system which includes a storage system for providing dynamically expandable dynamic logical volumes, a host computer with file systems for inputting/outputting data to/from the dynamic logical volumes, and a management server for managing the storage system and the host computer has been proposed, for example (See PTL1, for example).

The storage system in the foregoing storage system is configured comprising an allocation part for allocating storage areas in predetermined units to the dynamic logical volumes when data, transmitted from the host computer, is stored in the dynamic logical volumes, a management part for managing the storage areas, among the storage areas allocated by the allocation part to the dynamic logical volumes, which are identified as being currently used by the file systems, and a release part for releasing storage areas not being managed by the management part from the dynamic logical volumes.

With the foregoing storage system, storage areas can be efficiently operated using a simple configuration as a result of the storage system allocating storage areas to the dynamic logical volumes in predetermined units when data transmitted from the host computer is stored in the dynamic logical volumes, managing the storage areas, among the storage areas allocated to the dynamic logical volumes, which are identified as currently in use by the file systems, and releasing unmanaged storage areas from the dynamic logical volumes, the storage system thereby releasing unnecessary storage area from the dynamic logical volumes without ascertaining the structure of the file systems.

However, in the foregoing storage system, no consideration is paid to performing effective data migration by way of co-operation between the storage system and the file systems.

Furthermore, network storage (Network Attached Storage) in which a storage system is connected to a network and used as a shared disk of computers connected to the network has been proposed. The network storage (NAS) is configured from a server which comprises a network interface and so on, and a disk drive for storing data.

If a file system or part of a file system is migrated in NAS with a cluster structure that includes a server, file data must be copied between each of the disk devices of each server. In this case, when there is a large volume of data, it takes time to copy the file data and client file access performance may deteriorate.

For this reason, an arrangement has been proposed whereby, in a storage system which comprises a plurality of servers, file systems or partial directory trees thereof are migrated without being copied (See PTL2).

In the system disclosed in PTL2, a configuration is adopted such that the plurality of servers comprise a management table for managing file systems or part thereof and a mapping table for managing relationships between logical devices of disk subsystems and logical units which recognize the servers, and, when a file system is migrated from a first server to a second server of the plurality of servers, the first server refers to the mapping table and transmits a direction to the second server to update the relationships between the logical devices and logical units, and the second server recognizes new logical units and updates management server identifiers in the management table.

CITATION LIST

Patent Literature

PTL 1: Japanese Patent Publication Laid-Open No. 2007-257317
PTL 2: Japanese Patent Publication Laid-Open No. 2007-94473

SUMMARY OF INVENTION

Technical Problem

Furthermore, migration processing is executed such that, if a plurality of physical volumes which are configured hierarchized in a plurality of tiers are managed as file system data storage areas in correspondence with storage devices of a plurality of types of varying processing performances, when there is a drop in the access frequency to files belonging to a high-performance and high-cost tier, the files are migrated to a physical volume which belongs to a low-speed but low-cost tier. When this processing is performed, since data with a reduced access frequency are not continually stored as is in a high-performance and high-cost tier, data management costs can be reduced.

Here, if the configuration disclosed in PTL2 is adopted, data migration between servers is such that data and files are transferred via a network which links a first file server to a second file server. When information relating to the data and files is transferred via the network linking the first and second servers, if the volume of information is large, the network load is high and times for executing data migration are limited.

The present invention was conceived in view of problems with the foregoing conventional technology, and an object of the present invention is to provide a storage system and method of controlling same with which data migration can be efficiently executed with optional timing through co-operation between file systems and a storage system with a tiered structure.

Solution to Problem

In order to achieve this object, the present invention divides the storage areas of the physical volumes of each tier with a tiered structure into a plurality of blocks, manages each of the blocks as pages, manages a specified page among the plurality of pages as a virtual page, and when migrating data of a physical volume of any tier to a physical volume of another tier, temporarily stores data serving as a migration target, i.e. migration target data, in a virtual page of the data migration source, collects the data which has been stored in the virtual page of the data migration source, and migrates this data to a virtual page of the physical volume of the data migration destination. Here, the plurality of physical volumes can be managed as data storage areas of file systems that are obtained by integrating and virtually configuring file groups. Data of files belonging to the file system can be managed as data serving as a migration target.

Advantageous Effects of Invention

According to the present invention, data migration can be efficiently executed with optional timing.

BRIEF DESCRIPTION OF DRAWINGS

FIG. 3 A diagram showing the composition of mapping information.

FIG. 7 A diagram showing the composition of stub information.

DESCRIPTION OF EMBODIMENTS

EXAMPLES

In this example, the storage areas of the physical volumes in each tier, which have a tiered structure, are divided into a plurality of blocks, the blocks are each managed as pages, a specified page among the plurality of pages is managed as a virtual page, and when data of a physical volume of any tier is migrated to a physical volume of another tier, data serving as a copy target (migration target), i.e. the data which is the target of the migration, is temporarily stored in a virtual page of the data migration source, and the data which has been stored in the virtual page of the data migration source is collected and copied to a virtual page of the physical volume of the copy destination (data migration destination).

An embodiment according to the present invention will be explained hereinbelow with reference to the drawings.

Figure 1:
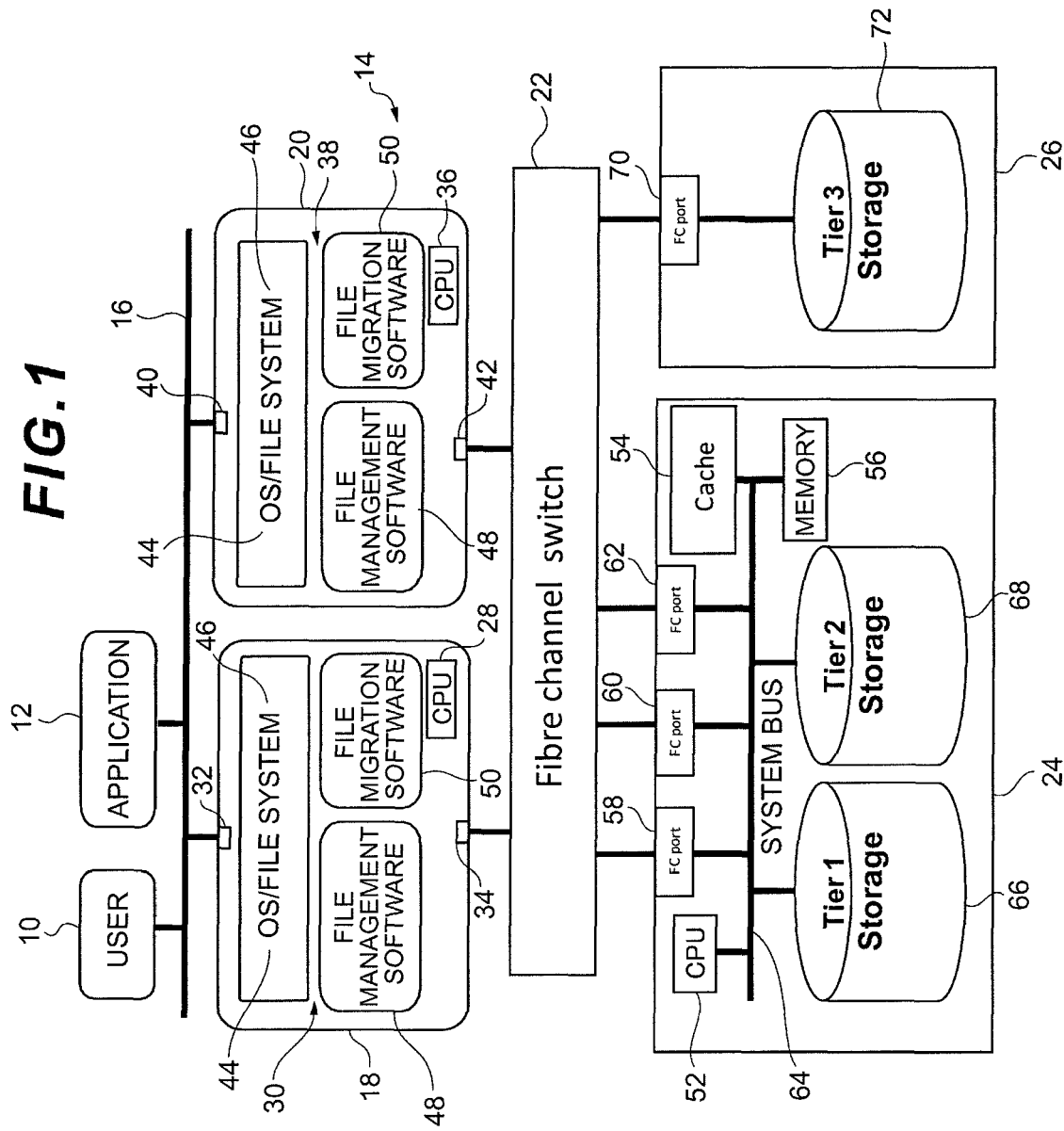
FIG. 1 A block configuration diagram of a computer system to which the present invention is applied.

FIG. 1 is a block configuration diagram of a computer system to which the present invention is applied. In FIG. 1, the computer system comprises a user terminal 10, an information terminal 12, a storage system 14, and a network 16, and the user terminal 10, information terminal 12, and storage system 14 are connected to one another via a network 16.

The user terminal 10 is configured from a microcomputer which includes a CPU (Central Processing Unit), input/output devices, a memory, and an input/output interface, and so forth, for example.

The information terminal 12 provides, as a terminal for providing various information, application programs (may also be referred to as 'applications') to the user terminal 10 and storage system 14, for example. Note that the network 16 is configured from a LAN (Local Area Network), for example, as a first network.

The storage system 14 comprises a file server 18, a file server 20, a Fibre Channel switch 22, and storage apparatuses 24 and 26, and the file servers 18 and 20 and the storage apparatuses 24 and 26 are connected to each another via the Fibre Channel switch 22.

The file server 18 includes a CPU 28 that performs integrated control of the whole file server 18, a memory 30, and ports 32 and 34, the port 32 being connected to the network 16 and the port 34 being connected to the Fibre Channel switch 22.

The file server 20 includes a CPU 36 that performs integrated control of the whole file server 20, a memory 38, and ports 40 and 42, the port 40 being connected to the network 16 and the port 42 being connected to the Fibre Channel switch 22.

The memories 30 and 38 store, as software, an OS (Operating System) 44, a file system 46, file management software 48, file migration software 50, and the policy information and file management information (none is illustrated) and so forth.

The CPUs 28 and 36 each execute processing in accordance with the software stored in the memories 30 and 38 respectively, exchange information via the user terminal 10, the information terminal 12, and the network 16, and exchange information with the storage apparatuses 24 and 26 via the Fibre Channel switch 22.

The OS 44 is software for executing applications which are provided by the information terminal 12. The file systems 46 are configured as tiered file systems in which a plurality of file systems, which include file groups and directory groups that are arranged tiered on the physical volumes which the storage areas of the storage apparatuses 24 and 26 comprise, are integrated and virtually tiered. These file systems (also referred to hereinafter as tiered file systems) 46 are managed by each of the file servers 18 and 20 as access targets of the user terminal 10 which is the source of access requests, and provided to the user terminal 10.

Here, the file systems 46 are configured so as to be capable, upon receipt of an access request from the user terminal 10, for example, of accessing the files and directories stored in file systems in any of the tiers of the file systems 46.

Here, the following rules, for example, are used for the file systems 46 if the file systems 46 allow the source of an access request such as an application program that exists in the user terminal 10 or information terminal 12 to access files and directories which are stored in the file systems of each tier belonging to the file systems 46.

Files and directories stored in the file systems of each tier which belong to the file systems 46 appear as if they were files and directories stored in the file systems 46.

The path names of the files and directories are the same in the file systems in each tier belonging to the file systems 46 as in the file systems 46.

The file systems 46 are file systems in which files are actually stored if read access or write access to a certain file is received, and executes one-to-one read access or write access to files with the same path name.

Here, files are collections of data with a fixed relationship which include a file body of real data, and metadata. However, files may also be referred to simply as files without being distinguishing between the file body and metadata.

Metadata is file attribute information which includes information relating to the file path, file size, file existence, file hash value, file update date and time, and the existence of a stub (stub information) and so on. This metadata is stored in the memory 30, 38 as file management information.

The file management software 48 is software which executes processing to refer to the file management information 100, ascertain the file attributes of each file, and arrange each file in the optimum tier in accordance with the bit cost and performance and so on of each of the storage 66, 68, 72.

The file migration software 50 is software for instructing the storage apparatus to perform processing to migrate the file defined by the policy information from one tier to another as defined in the policy information.

Policy information is information which is defined by the user operating the user terminal 10 and used to define a migration condition. For example, such information is, in an access frequency-based definition: when a month has elapsed since a file stored in a file system of a higher level tier was last accessed, the file is migrated to a lower level tier.

The storage apparatus 24 is configured from a CPU 52, a cache (cache memory) 54, a memory 56, ports (Fibre Channel ports) 58, 60, 62, a system bus 64, and storage 66, 68, where each of the parts are interconnected via the system bus 64 and the ports 58, 60, 62 are each connected to the Fibre Channel switch 22. In this case, the system bus 64 comprises a second network together with the Fibre Channel switch 22.

The storage apparatus 26 is configured from a port 70 and storage 72, and the port 70 is connected to the Fibre Channel switch 22.

The CPU 52 executes various processing in accordance with a processing program stored in the memory 56, and is configured as a storage controller for performing overall control of the storage apparatuses 24 and 26.

Here, the CPU 52 exchanges information with each of the Fibre servers 18 and 20 via the ports 58, 60, and 62 and controls input/output processing of data to/from the storage 66, 68, and 72.

The cache 54 is configured as a data storage area for temporarily storing data. The memory 56 stores various types of information such as virtual page management information and stub information, and software resources such as processing programs.

The storage 66, 68, 72 are configured as a plurality of storage apparatuses which include storage devices of a plurality of types of varying processing performance such as response performance, for example.

Specifically, if a plurality of storage apparatuses are configured using storage devices of three types, i.e. storage devices with high-speed, medium-speed, and low-speed processing performances, the storage 66 is configured from a storage device that belongs to the upper tier (hereinafter referred to as 'Tier 1'), the storage 68 is configured from a storage device which belongs to the middle tier (hereinafter called 'Tier 2'), and the storage 72 is configured from a storage device which belongs to the lower tier (hereinafter called ('Tier 3').

As the storage devices of each tier, SSDs (Solid State Drives), SAS (Serial Attached SCSI) disks, SATA (Serial ATA) disks, and FC (Fibre Channel) disks and so forth can be employed.

Figure 2:
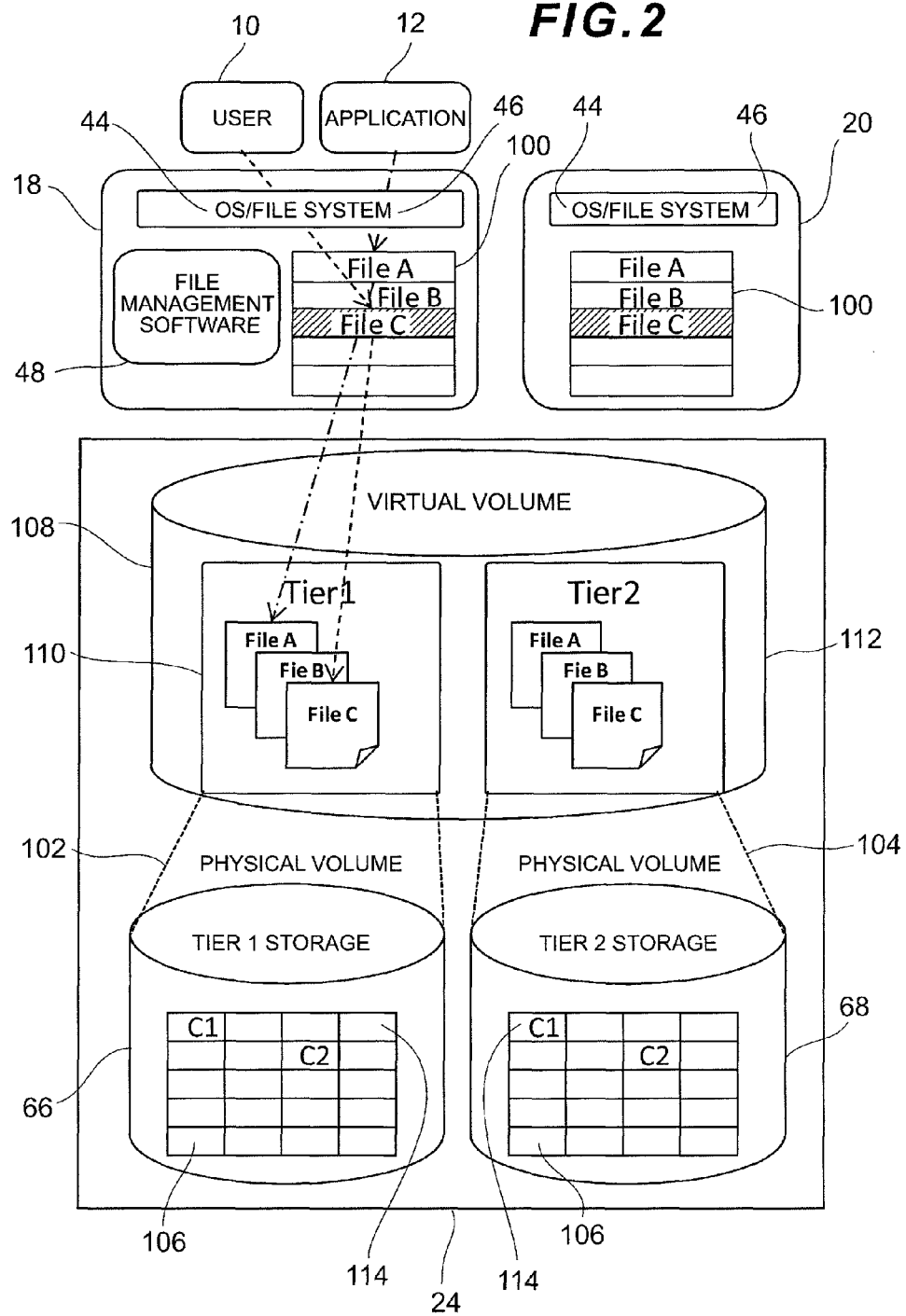
FIG. 2 A schematic diagram explaining a system configuration of a storage system.

Next, FIG. 2 shows a schematic diagram of a system configuration of the storage system. In FIG. 2, information relating to file groups that the file systems 46 comprise is stored in the file management information 100. For example, if a file system that belongs to Tier 1 or Tier 2 is configured from a file A, file B, and file C and so on, information relating to the access date and time, the update date, creation date, and application type and so forth is stored in the file management information 100 as the file attributes of each file. The file management information 100 is stored in the memory 30, 38 alongside the policy information which determines migration conditions for each file.

Policy information is information which is defined by the user operating the user terminal 10 and used to define a migration condition. For example, such information is, in an access frequency-based definition: when a month has elapsed since a file belonging to a Tier 1 file system was last accessed, the file is migrated to Tier 2, and when six months have passed since a file belonging to a Tier 2 file system was last accessed, the file is migrated to Tier 3. In this case, the file migration software 50 monitors the access states of each file and, with timing at which the migration condition defined by the policy information is satisfied, executes processing to migrate each file from one tier to another as defined by the policy information.

When storing the data in the files of the file systems belonging to each tier in the storage 66, 68, and 72, the storage areas of the storage 66 and 68, for example, are managed as physical volumes 102 and 104, and each of the storage areas of the physical volumes 102 and 104 are divided into a plurality of blocks, where the blocks are each managed as pages 106.

Here, the virtual volume 108, which is the access target of each of the file servers 18 and 20 and obtained by virtualizing the physical volumes 102 and 104, is constructed on the physical volumes 102 and 104. The virtual volume 108 is configured from a virtual area 110 for storing files of the file system belonging to Tier 1 and a virtual area 112 for storing files of the file system belonging to Tier 2. The virtual areas 110 and 112 are each configured as areas for storing each of the files and the logical storage areas thereof are allocated as logical volumes from the physical volumes 102 and 104.

Furthermore, data of any of the files is stored in each of the pages 106 of the storage 66 and 68. For example, the file C includes data C1 and C2 as data and, if stored in the virtual area 110, the data C1 and C2 are stored in any of the pages 106 of the physical volume 102. Furthermore, if the file C is stored in the virtual area 112, the data C1 and C2 of file C is stored in any of the pages 106 of the physical volume 104. Note that two virtual volumes 108 may be provided and a virtual area formed in each of the virtual volumes.

Figure 3:
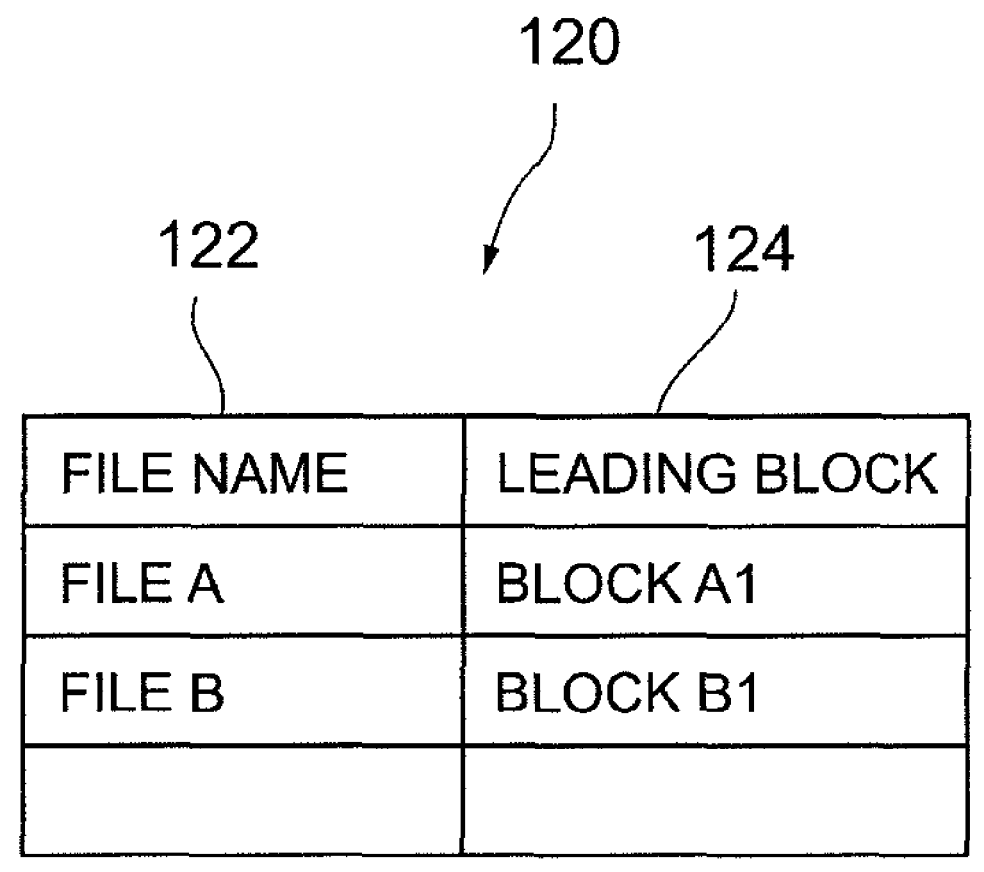

Next, FIG. 3 shows the composition of mapping information for managing relationships between files and block data.

In FIG. 3, the mapping information 120 is configured from a file name field 122 and a leading block field 124, and is stored in the memory 30 and 38. The file names are names for identifying each of the files, and the names of each file which are stored as entries of the file name field 122 are 'File A' for file A and 'File B' for file B, for example.

The leading block is an identifier for identifying the leading block of the data belonging to each file. 'Block A1' and 'Block B1' are stored as entries of the leading block field 124 in correspondence with file A and file B respectively.

Figure 4:
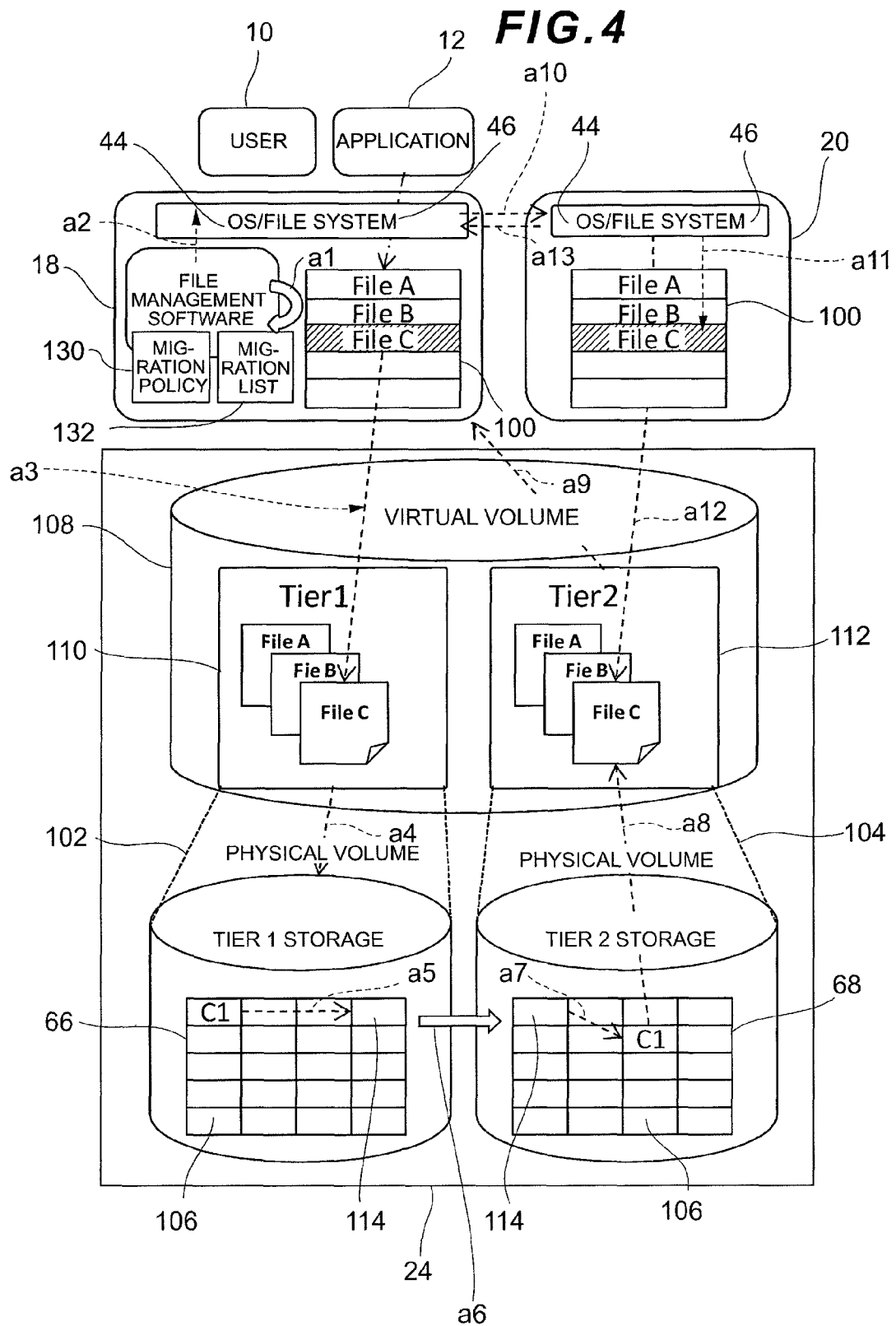
FIG. 4 A schematic diagram explaining data migration processing of the storage system.

Data migration processing will be explained next with reference to the schematic diagram shown in FIG. 4. First, for the processing of the migration source file server 18, the file management software 48 refers to the file management information 100 and the migration policy 130 belonging to the policy information, checks the content of each file such as the state of access to each file, for example, determines whether each file satisfies the migration condition defined by the migration policy 130, and creates a data migration list 132 in accordance with the determination result (a1). For example, if file C is identified as a file which satisfies the migration conditions, file C appears in the data migration list 132 as a target file.

Thereafter, the file migration software 50 outputs an instruction relating to file data migration on the basis of the subject matter contained in the data migration list 132 to the CPU 52 of the storage apparatus 24 (a2, a3). This instruction is an instruction for migrating file C from Tier 1 to Tier 2, for example, and the CPU 52 executes a data copy between virtual pages in accordance with this instruction.

Specifically, if the data of file C which belongs to Tier 1 is configured from C1, the CPU 52 temporarily stores data C1 in the virtual page 114 (a4, a5). Thereafter, the CPU 52 copies data C1, temporarily stored in the virtual page 114 of the physical volume 102, to the virtual page 114 of the physical volume 104 via the system bus 64 (a6), and stores data C1 which is stored in the virtual page 114 on a different page 106 from the virtual page 114 (a7).

Subsequently, after data C1 has been stored in the page 106 of the physical volume 104, the controller (CPU 52) updates volume management information for managing the data of each of the physical volumes 102 and 104 in accordance with information indicating the storage point of data C1 (a8).

Thereafter, the controller (CPU 52) notifies the file server 18 of change information to the effect that file C is stored in the virtual area 112 and data C1 of file C is stored in the physical volume 104 (a9). The file server 18 accordingly updates the content of the file management information 100 and transfers the content of the updated file management information 100 to the file server 20 via the network 16 (a10).

Upon receiving the updated file information 100, the file server 20 then updates the content of its own file management information 100 on the basis of the received file management information 100 (a11) and accesses the file C on the basis of the updated file management information 100 (a12). Once file C has been accessed, the file server 20 notifies the file server 18 that the change is complete (a13).

Thereafter, the file server 18 refers to the file management information 100 on condition that a change completion notice is received and generates stub information by converting file management information 100 pertaining to file C in the file management information 100 into a stub.

For example, when the file management information 100 pertaining to file C is converted into a stub, the file server 18 deletes the file attributes of file C from the file management information 100 and generates, as stub information, reference information which represents information to the effect that the storage destination (storage point) of file C is page 106 of the physical volume 104 and that file C is under the management of the file server 20.

In this case, migration is from Tier 1 to Tier 2 and therefore the stub information is reference information referring to a file in migration destination storage 68 from the file server 18. Note that, in this example, reference information referring to a file in the storage 66 from the storage 68 or reference information referring to a file in the storage 68 from the file server 20 is also referred to as stub information.

Figure 5:
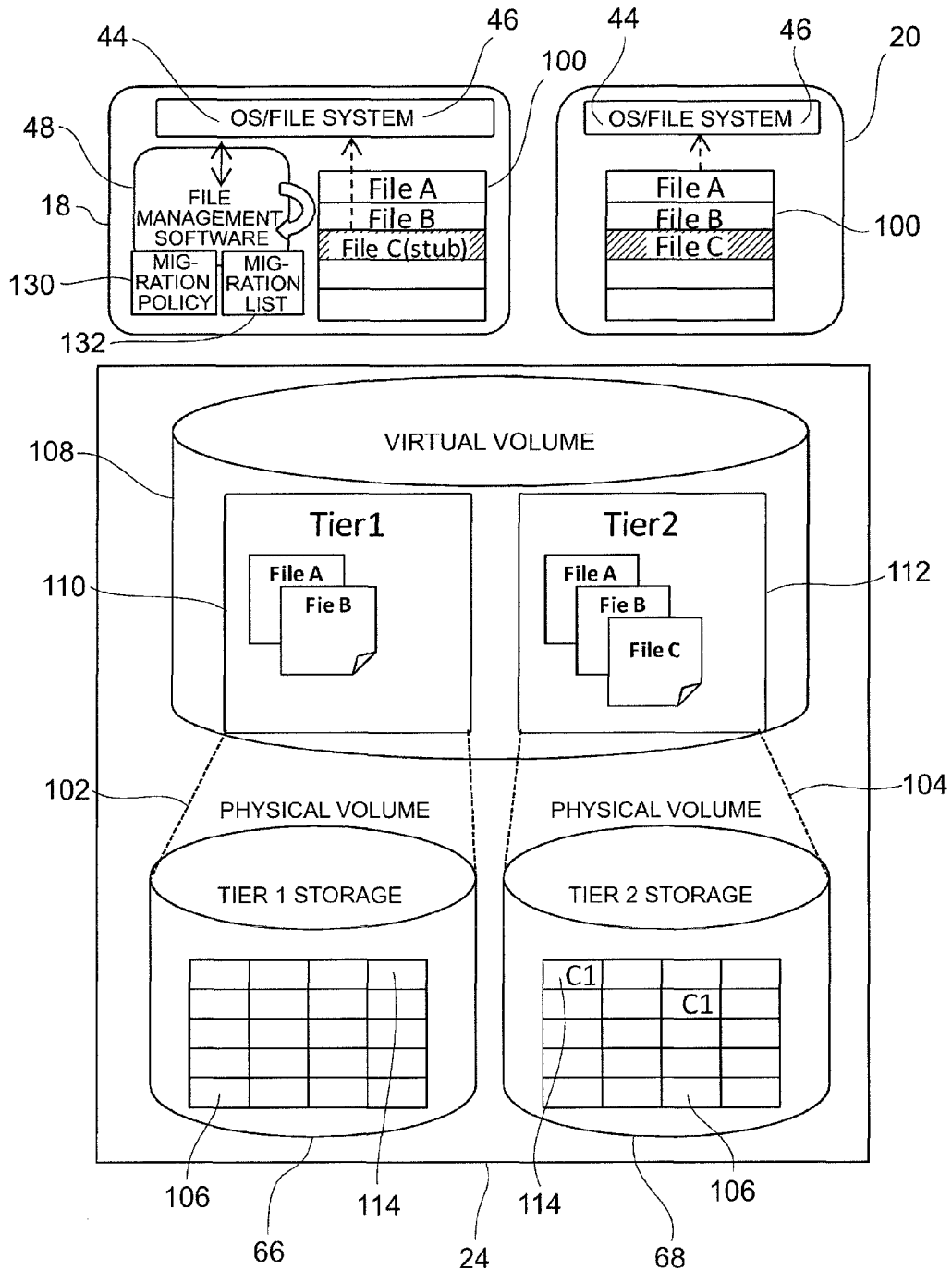
FIG. 5 A schematic diagram explaining a state after the data migration of the storage system is complete.

Here, a state of the storage system after data migration is complete is shown in FIG. 5. In FIG. 5, information pertaining to file C in the file management information 100 of the file server 18 is converted into a stub after data migration is complete. Furthermore, the file management information 100 in the file server 20 stores information relating to the file attributes of the file C.

Figure 6:
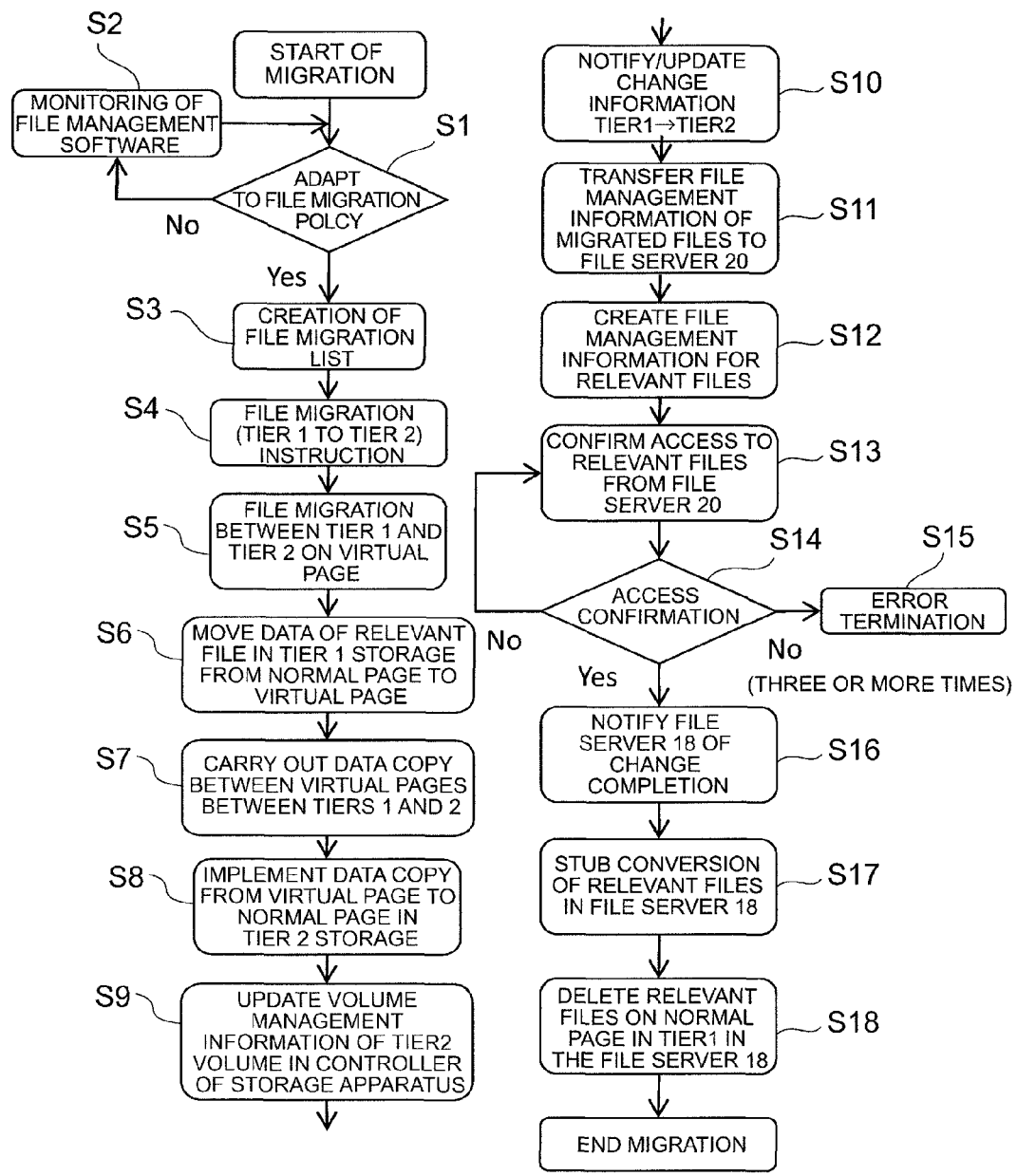
FIG. 6 A flowchart explaining data migration processing of the storage system.

The specific subject matter of the data migration processing will be explained next with reference to the flowchart in FIG. 6.

First, the file management software 48 refers to, as processing of the migration-source file server 18, the file management information 100 and the migration policy 130 belonging to the policy information, checks the content of each file such as the state of access to each file, for example, identifies whether each file satisfies the migration condition defined by the migration policy 130 (S1), checks for each file, when the migration condition is not satisfied, the state of access to each file (S2), determines once again whether or not each file satisfies the migration condition defined in the migration policy 130 (S1).

However, upon determining that the migration condition is satisfied for each file, the file management software 48 creates a data migration list 132 in accordance with the determination result (S3). For example, if file C is identified as a file which satisfies the migration conditions, file C appears in the data migration list 132 as a target file.

The file migration software 50 then monitors the access state to file C and, with timing at which the migration condition defined by the policy information is satisfied, outputs an instruction relating to the movement of the data of file C on the basis of the content in the data migration list 132 to the CPU 52 of the storage apparatus 24 (S4). This instruction is an instruction for migrating file C from Tier 1 to Tier 2, for example.

Thereafter, the CPU 52 of the storage apparatus 24 migrates a file belonging to Tier 1, for example file C, to Tier 2 (S5), and if the data of file C is configured from C1 and is stored in a page of the physical volume 102 (also sometimes referred to as a 'normal page') 106, temporarily moves data C1 of the page 106 to the virtual page 114 of the physical volume 102 (S6).

Thereafter, the CPU 52 copies (data-copies) data C1, temporarily stored in the virtual page 114 of the physical volume 102, to the virtual page 114 of the physical volume 104 via the system bus 64 (S7), and copies (data-copies) data C1 which is stored in the virtual page 114 of the physical volume 104 to a different page 106 from the virtual page 114 (S8).

Subsequently, after data C1 has been stored in the page 106 of the physical volume 104, the CPU 52 updates volume management information in accordance with information indicating the storage point of data C1 (S9).

Thereafter, the CPU 52 notifies the file server 18 of change information to the effect that file C is stored in the virtual area 112 of Tier 2 and data C1 of file C is stored in page 106 in the physical volume 104 (information indicating that file C has migrated from Tier 1 to Tier 2) (S10).

The file server 18 which has received the change information notice from the CPU 52 updates the content of the file management information 100 and transfers the content of the updated file management information 100 to the migration destination file server 20 via the network 16 (S11).

Upon receiving the updated file information 100, the file server 20 then updates the content of its own file management information 100 on the basis of the received file management information 100 and creates file management information 100 pertaining to file C (S12).

The file server 20 then executes access confirmation processing for accessing file C on the basis of the file management information 100 relating to the created file C (S13), and determines whether or not file C can be accessed (S14); when file C cannot be accessed, the processing of steps S13 and S14 is repeated three times, and when file C cannot be accessed even when the processing is repeated three times, the file server 20 executes error processing (S15) and terminates the processing of this routine.

However, when it is confirmed in step S14 that file C is accessible, the file server 20 notifies the file server 18 that the change is complete once the processing to migrate file C from Tier 1 to Tier 2 is complete (S16).

Thereafter, the file server 18 refers to the file management information 100 on condition that a change completion notice is received and generates stub information by converting file management information 100 pertaining to file C in the file management information 100 into a stub (S17).

For example, the file server 18 deletes the file attributes of file C from the file management information 100 and generates, as stub information, reference information which represents information to the effect that the storage destination (storage point) of file C is page 106 of the physical volume 104 and that file C is under the management of the file server 20.

Thereafter, the file server 18 deletes a target file which is a migration target and which belongs to Tier 1, deletes data which is stored in the page (normal page) 106 and which is the data of the target file (S18), and terminates the processing of this routine. For example, the file C is deleted from the virtual area 110 of the virtual volume 108, and deletes the data C1 of file C from the page 106 of the physical volume 102.

Here, FIG. 7 shows the composition of the stub information 140. In FIG. 7, the stub information 140 comprises a saved information field 142 and a saved information description field 144.

Saved information is information which is used as reference information with which each file server refers to files stored in storage that is under the management of another file server. The entry of the saved information field 142 stores, as saved information for specifying migration-destination archive storage if storage 68 is configured from archive storage, for example, 'archive storage identification information,' and the entry of the saved information description field 144 stores the IP address of the archive storage (node 1).

Furthermore, the entry of the saved information field 142 stores 'name space identification information' as information for identifying a name space for specifying registered files, and the entry of the saved information description field 144 stores 'file migration destination name space' information in correspondence with the 'name space identification information'. Furthermore, the entry of the saved information field 142 stores 'file identification information' as information for identifying a file path in a name space, and the entry of the saved information description field 144 stores information relating to 'a file path in the name space' in correspondence with the 'file identification information.'

Figure 8:
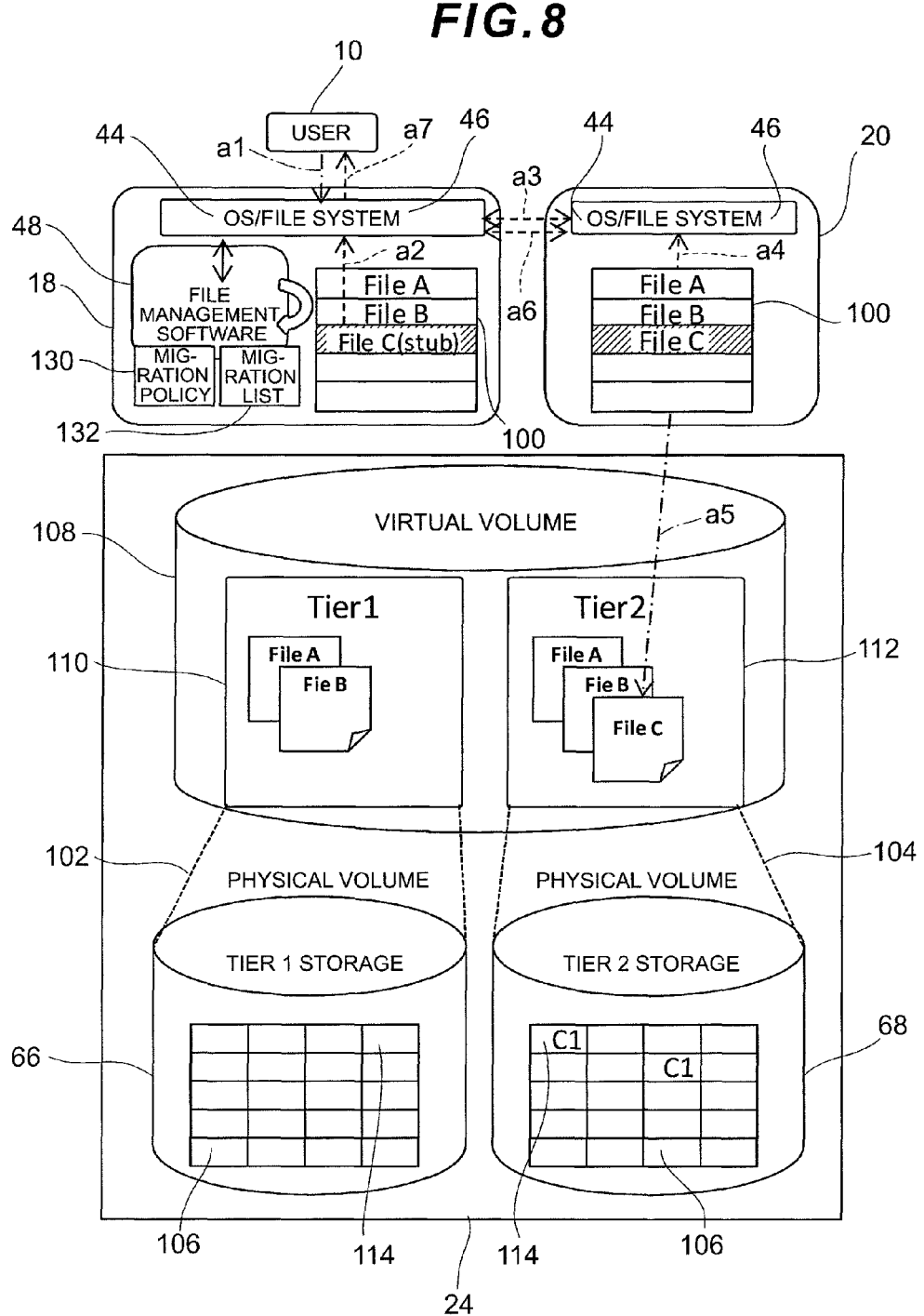
FIG. 8 A schematic diagram also explaining file access following data migration of the storage system.

The file access processing following data migration will be described next in accordance with FIG. 8.

When the user operates the user terminal 10 to access file C after file C of Tier 1 is migrated from Tier 1 to Tier 2 (a1), the CPU 28 of the file server 18 refers to the file management information 100 (a2) and accesses the file server 20 on the basis of the stub information of file C (including information indicating the storage destination of file C and information of the file server 20 managing file C) (a3).

Thereafter, in response to access from the file server 18, the file server 20 refers to the file management information 100 to retrieve the file system 46 (a4) and outputs an access request to the CPU 52 of the storage apparatus 24 in accordance with the file system 46.

In response to the access request from the file server 20, the CPU 52 accesses the virtual volume 108, reads the data of file C (a5), and transfers the read data to the file server 20.

Thereafter, the file server 20 transfers the data of file C to the file server 18 (a6). The file server 18 sends back data of the received file C to the user terminal 10 (a7).

Thus, even when the file C of Tier 1 migrates from Tier 1 to Tier 2, the user is able to acquire the data of file C by operating the user terminal 10 to access file C.

The management of pages in each of the physical volumes 102 and 104 will be explained next.

Figure 9:
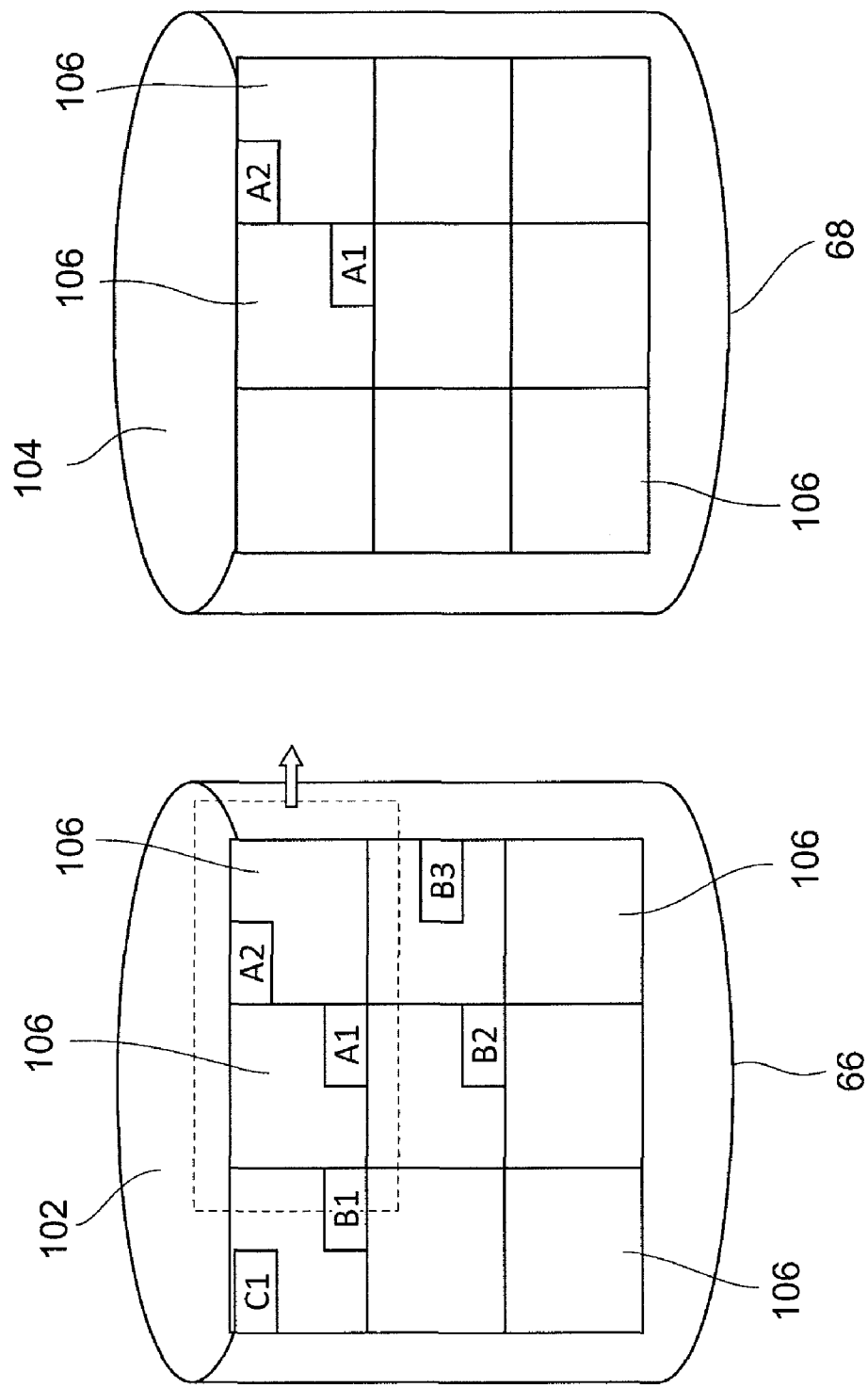
FIG. 9 A schematic diagram explaining the configuration of pages of physical volumes.

FIG. 9 shows the configuration of the pages of the physical volumes 102 and 104. A plurality of pages 106 are configured in the physical volumes 102 and 104 and the sizes (capacity) of each of the pages 106 are variably configured. If the data of each file is stored in any of the pages 106 among the plurality of pages 106, data may be stored so as to span two or more pages 106 depending on the data capacity of each file.

For example, if file A is configured from data A1, A2, the data of other files with different usage rates and access frequencies is sometimes mixed with the pages 106 storing data A1 such that data A2 cannot be stored in these pages and data A2 are sometimes stored in different pages 106 from data A1. If data A1, A2, which is stored spanning two pages 106, is copied from the physical volume 102 to the physical volume 104, when the data of the page 106 where data A1 is stored and the data of the page 106 storing data A2 are each copied individually in page units, the copy takes a long time and there is a drop in efficiency.

Meanwhile, when data A1, A2, which is stored spanning two pages 106, is batch-copied from the physical volume 102 to the physical volume 104, copying takes a short time but when the data of other files is mixed with the pages 106 storing data A1, A2, the data of the other files is also copied and it is not possible to copy only the data of file A. That is, for a plurality of files with different usage rates and access frequencies, data migration on a file by file basis cannot be performed in accordance with the usage rate and access frequency of each file.

Hence, in this example, when a plurality of pages 106 are configured for the physical volumes 102 and 104, a specified page among the plurality of pages 106 is managed as a virtual page 114 and data serving as the copy target, which is data of a migration target file (migration-source target file), is collected from each of the pages 106 and temporarily stored batchwise in the virtual page 114 and a plurality of data stored in the virtual page 114 is batch-copied to a virtual page of the copy-destination physical volume (migration-destination physical volume).

Figure 10:
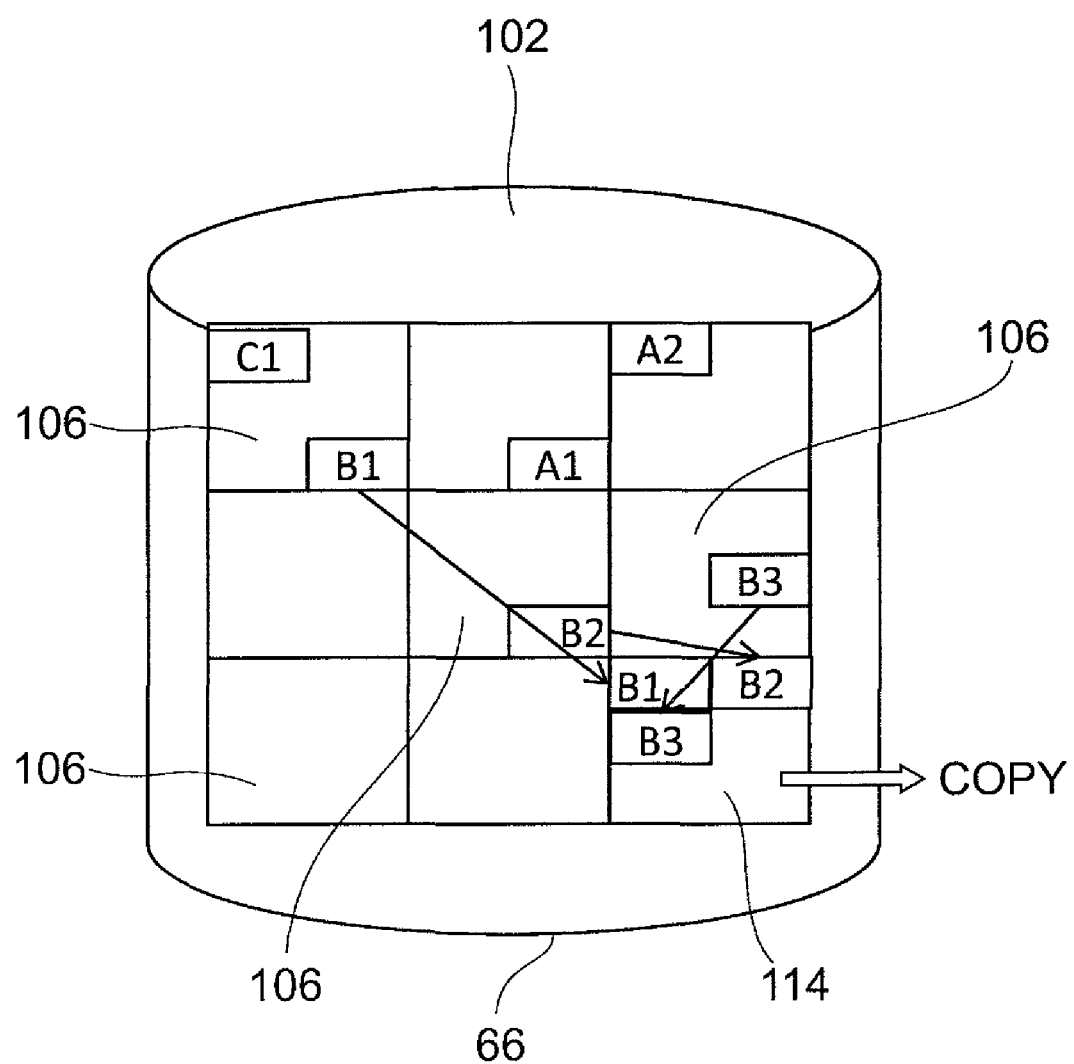
FIG. 10 A schematic diagram explaining a method of managing the physical volume pages.

For example, as shown in FIG. 10, the file B is configured from data B1, B2, and B3, and if the data B1, B2, and B3 are stored scattered across different pages 106, the data B1, B2, and B3 are each copied from each page 106 and temporarily stored in the virtual page 114, and the data B1, B2, and B3 stored in the virtual page 114 are batch-copied to the virtual page 114 of another physical volume. This processing is executed by the CPU 52 on the basis of an instruction from the file migration software 50.

The data B1, B2, and B3, stored scattered across the pages 106, is copied to the virtual page 114 and then deleted from each of the source pages 106. Furthermore, the data B1, B2, and B3 which has been copied to the virtual page 114 is copied and then overwritten to the virtual page 114 of another physical volume. Hence, after being overwritten, the virtual page 114 is re-used as a data storage area for temporarily storing copy data.

As described earlier, by temporarily storing the copy target data, which is the data of the file serving as a target of the migration, in the virtual page 114 and batch-copying a plurality of the data stored in the virtual page 114 to the virtual page of the copy destination physical volume, data migration on a file by file basis in response to the usage rates and access frequencies of each file can be executed more efficiently than if the data of each file is copied in page units.

Figure 11:
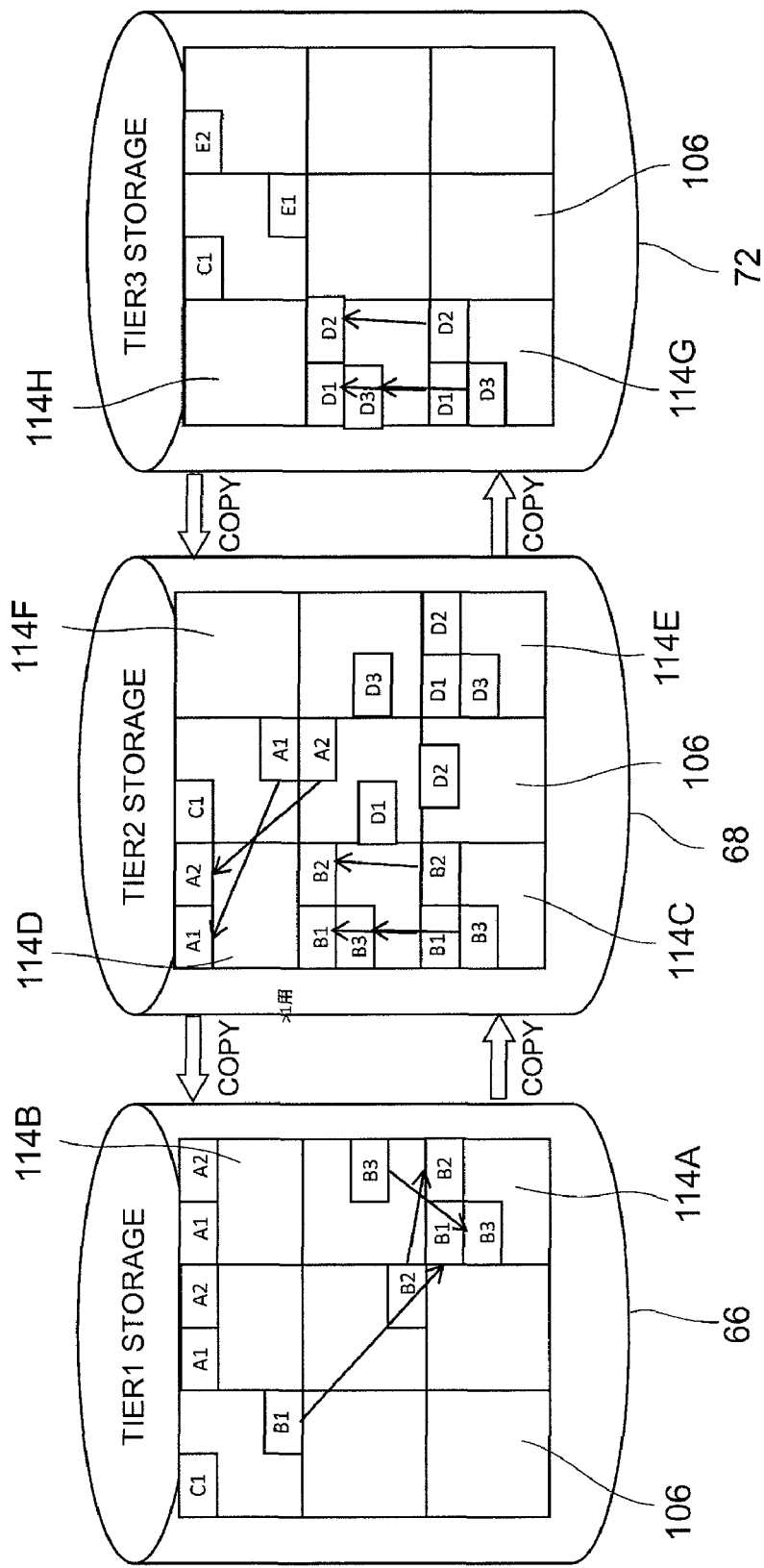
FIG. 11 A schematic diagram explaining a page management method for three-tiered storage.

A page management method for the storage 66, 68, and 72 will be described next with reference to FIG. 11.

When the plurality of pages 106 have been configured for the storage 66, 68, and 72, a specified page 106 among the plurality of pages 106 of each of the storage 66, 68, and 72 is configured as a virtual page 114.

For example, virtual pages 114A and 114B are configured as virtual pages in the storage 66 of Tier 1, the virtual pages 114C, 114D, 114E, and 114F are configured as virtual pages in the storage 68 of Tier 2, and virtual pages 114G and 114H are configured as virtual pages in the storage 72 of Tier 3.

The virtual page (first virtual page) 114A is a downgrade virtual page that is used when a file which belongs to Tier 1 is migrated to Tier 2, for example, for temporarily storing the file belonging to Tier 1 such as the data B1, B2, and B3 of the file B if, for example, the data B1, B2, and B3 of file B is stored spanning three pages 106. The data B1, B2, and B3, which is temporarily stored in the virtual page 114A, is copied and then overwritten to the virtual page 114C of the storage 68.

The virtual page (second virtual page) 114B is an upgrade virtual page that is used to migrate a file belonging to Tier 2 to Tier 1, for example, for temporarily storing the file belonging to Tier 2 such as the copied data A1, A2 of a file A if the data A1 and A2 is copied from the virtual page 114D of the storage 68. The data A1 and A2, which is temporarily stored in the virtual page 114B, is copied and then overwritten to any page 106 of the storage 66.

The virtual page (third virtual page) 114C is a downgrade virtual page that is used when migrating a file which belongs to Tier 1 to Tier 2, for example, for temporarily storing the file which belongs to Tier 1 such as the copied data B1, B2, and B3 of a file B if the data B1, B2, and B3 is copied from the virtual page 114A of the storage 66. The data B1, B2, and B3, which is temporarily stored in the virtual page 114C, is copied and then overwritten to any page 106 of the storage 68.

The virtual page (fourth virtual page) 114D is an upgrade virtual page that is used to migrate a file which belongs to Tier 2 to Tier 1, for example, for temporarily storing the file belonging to Tier 2 such as the data A1 and A2 of a file A. The data A1, A2, which is temporarily stored in the virtual page 114D, is copied and then overwritten to the virtual page 114B of the storage 66.

The virtual page (fifth virtual page) 114E is a downgrade virtual page that is used when migrating a file which belongs to Tier 2 to Tier 3, for example, for temporarily storing the file belonging to Tier 2 such as the data D1, D2, and D3 of a file D if the data D1, D2, and D3 of file D is stored spanning three pages 106. The data D1, D2, and D3, which is temporarily stored in the virtual page 114E, is copied and then overwritten to the virtual page 114G of the storage 72.

The virtual page (sixth virtual page) 114F is an upgrade virtual page that is used to migrate a file which belongs to Tier 3 to Tier 2, for example, for temporarily storing data copied from the virtual page 114H of the storage 72 of Tier 3. The data, which is temporarily stored in the virtual page 114F, is copied and then overwritten to any page 106 of the storage 68.

The virtual page (seventh virtual page) 114G is a downgrade virtual page that is used when migrating a file which belongs to Tier 2 to Tier 3, for example, for temporarily storing the file belonging to Tier 2 such as copied data D1, D2, and D3 of a file D if the data D1, D2, and D3 of file D is copied from the virtual page 114E of the storage 68. The data D1, D2, and D3 which is temporarily stored in the virtual page 114G, is copied and then overwritten to any page 106 of the storage 72.

The virtual page (eighth virtual page) 114H is an upgrade virtual page that is used to migrate a file belonging to Tier 3 to Tier 2, for temporarily storing the data of the file belonging to Tier 3. The data, which is temporarily stored in the virtual page 114H, is copied and then overwritten to the virtual page 114F of the storage 68.

Figure 12:
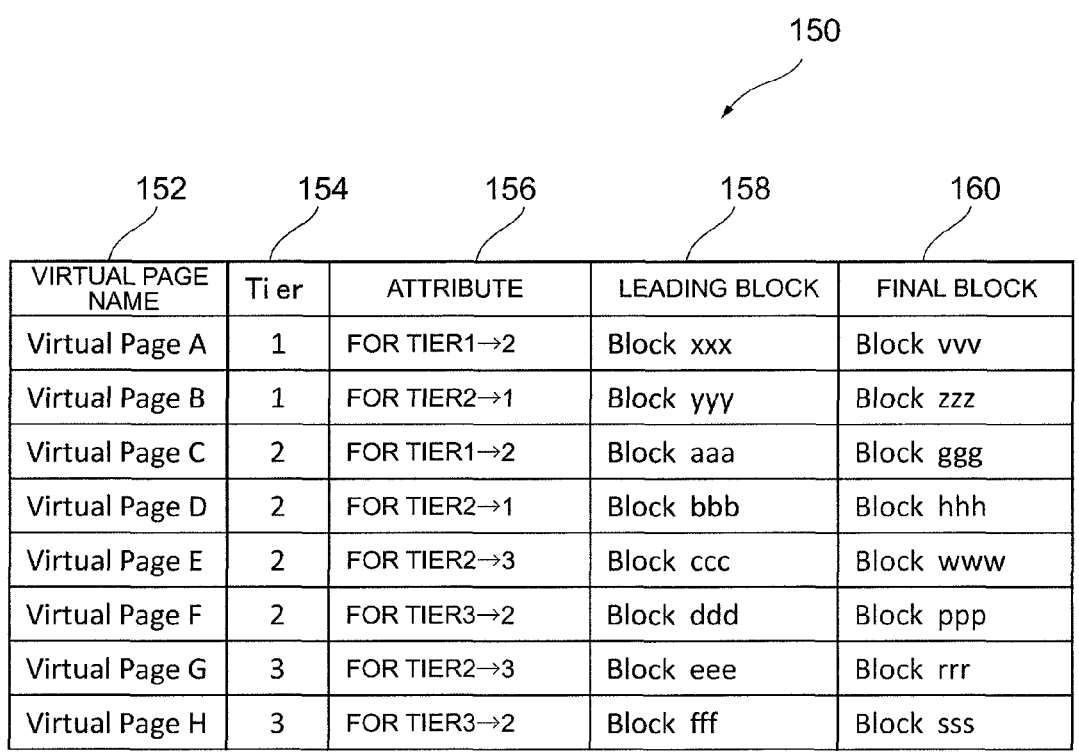
FIG. 12 A diagram showing the composition of virtual page management information.

Next, FIG. 12 shows the composition of virtual page management information 150 for managing each virtual page. The virtual page management information 150 is configured from a virtual page name field 152, a Tier field 154, an attribute field 156, a leading block field 158, and a final block field 160.

The virtual page name is a name for uniquely identifying virtual pages in each of the storages 66, 68, and 72. Entries of the virtual page name field 152 store 'Virtual Page A' to 'Virtual Page H' as virtual page names in correspondence with virtual pages 114A to 114H.

Tiers are identifiers for identifying the tiers in which the virtual pages 114A to 114H are each configured. The entries of the Tier field 154 each store '1,' '2,' and '3 ' as the numbers of the tiers to which the virtual pages 114A to 114H belong.

The attribute stores information indicating whether each virtual page is used for a downgrade or an upgrade For example, since the virtual page 114A is used for a downgrade in that it is used when migrating Tier 1 files from Tier 1 to lower Tier 2, this entry stores the information 'for Tier 1 to 2.' On the other hand, since the virtual page 114D is used for an upgrade in that it is used when migrating Tier 2 files from Tier 2 to upper Tier 1, this entry stores the information 'for Tier 2 to 1.'

The leading block is information for identifying the leading blocks of files stored in each virtual page. Among each of the entries for the leading block field 158, the entry which corresponds to the virtual page 114A with the virtual page name 'Virtual Page A,' for example, stores 'Block xxx.'

The final block is information for identifying the final blocks of files stored in each virtual page. Among each of the entries for the final block field 160, the entry which corresponds to the virtual page 114A with the virtual page name 'Virtual Page A,' for example, stores the information 'Block vvv.'

Figure 13:
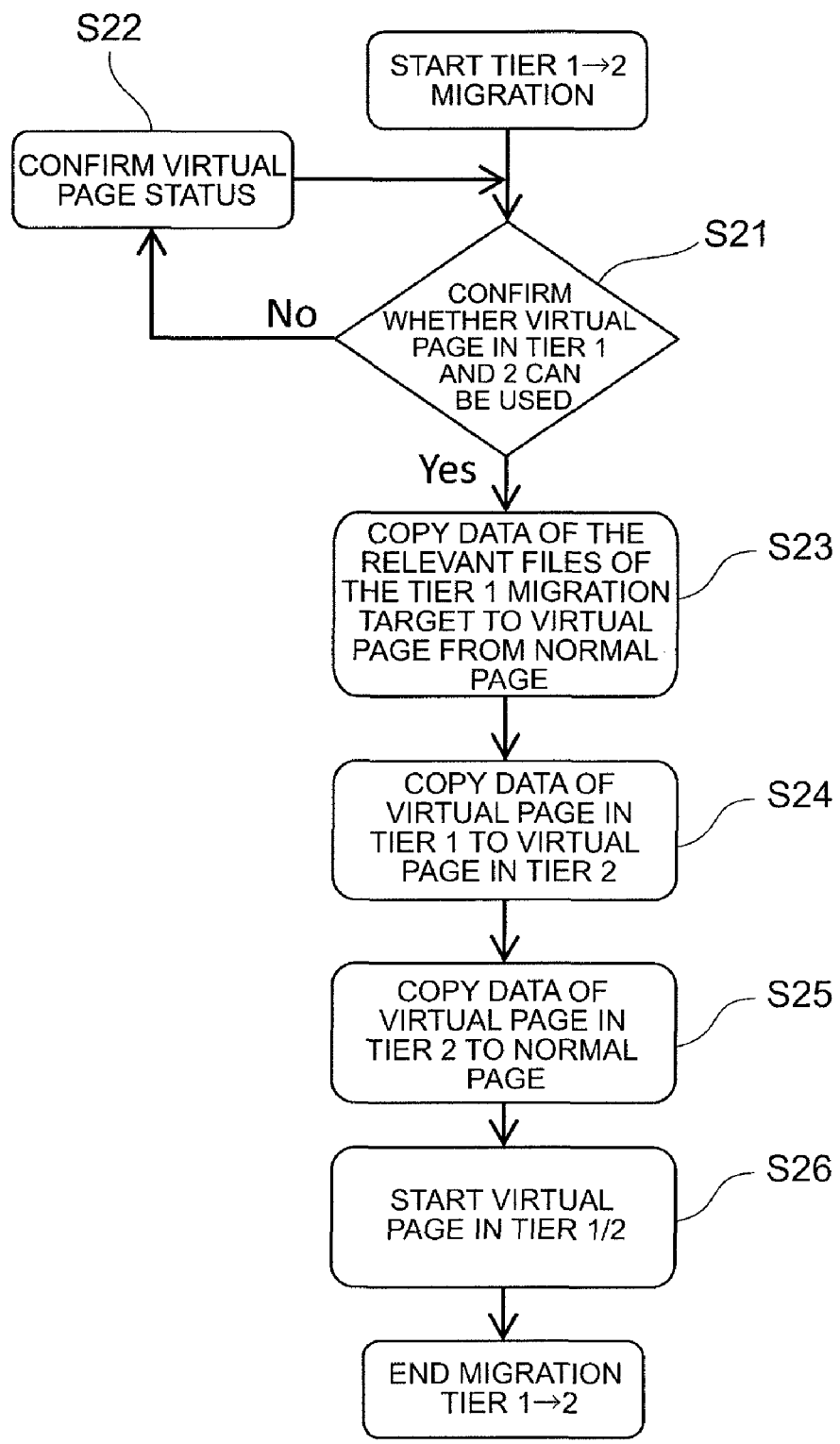
FIG. 13 A flowchart illustrating the page management method.

The page management method will be explained next with reference to the flowchart in FIG. 13.

When migrating files belonging to Tier 1 to Tier 2, the CPU 52 of the storage apparatus 24 starts migration processing on the basis of an instruction from the file migration software 50, first checking whether virtual pages 114 in Tier 1 and Tier 2 are usable (S21), and upon determining that the virtual pages 114 in Tier 1 and Tier 2 cannot be used, the CPU 52 checks the states of the virtual pages 114 in Tier 1 and Tier 2 (S22), and re-checks whether the virtual pages 114 in Tier 1 and Tier 2 can be used.

Upon determining in step S21 that the virtual pages 114 in Tier 1 and Tier 2 can be used, if the data of the migration target file among the Tier 1 files is stored scattered across a plurality of pages (sometimes also referred to as normal pages) 106, the CPU 52 copies the data of the migration target file from the normal page 106 to the Tier 1 virtual page 114 (S23), and copies the data which has been copied to Tier 1 virtual page 114 to Tier 2 virtual page 114 (S24).

The CPU 52 then copies the data copied to the Tier 2 virtual page 114 to any of the pages (normal pages) 106 in Tier 2 (S25).

Thereafter, the CPU 52 overwrites the Tier 1 virtual page 114 and Tier 2 virtual page 114, and opens the Tier 1 virtual page 114 and Tier 2 virtual page 114 as data storage areas for temporarily storing data (S26), and completes the processing for migrating the file belonging to Tier 1 to Tier 2.

According to this example, the configuration is such that when a Tier 1 file is migrated to Tier 2, file management information relating to the Tier 1 file is transferred from the file server 18 to the file server 20 via the network 16, and data pertaining to the Tier 1 file is transferred from the storage 66 to the storage 68 via the system bus 64, thereby enabling the load of the network 16 to be reduced and restrictions on the times for executing data migration to be suppressed.

According to this example, when the Tier 1 file is migrated to Tier 2, copy target data, which is the data of the file (Tier 1 file) serving as the migration target, is temporarily stored in the Tier 1 virtual page 114, and the data stored in the virtual page 114 is batch-copied to the Tier 2 virtual page (copy destination virtual page) 114, and hence data migration of the Tier 1 file can be efficiently executed with optional timing (timing configured by policy information).

Furthermore, in this example, a case is described where the migration source tier is Tier 1 and the migration destination tier is Tier 2, and a Tier 1 file is migrated to Tier 2. However, the present invention can be applied in cases where Tier 2 files are migrated to Tier 3, and conversely where Tier 3 files are migrated to Tier 2 or Tier 2 files are migrated to Tier 1.

For example, when the usage rate and access frequency for the data of Tier 2 files is high, if policy information for migrating Tier 2 files to Tier 1 has been configured, when the migration conditions configured in the policy information are satisfied, copy target data which is the data of files (Tier 2 files) serving as migration targets can be temporarily stored in the Tier 2 virtual page 114 with that timing, and the data stored in virtual page 114 can be batch-copied to the Tier 1 virtual page (copy destination virtual page) 114.

In addition, if the policy information is policy information determining that files belonging to Tier 1 are to be migrated to Tier 2, the CPU 52 selects Tier 1 as the migration source tier and Tier 2 as the migration destination tier, and if migration target files are to be migrated from Tier 1 to Tier 2, data stored in the plurality of Tier 1 pages 106 can be migrated to virtual page 114A, and the data which has been migrated to the virtual page 114A can be migrated to the migration destination Tier 2 virtual page 114C.

Similarly, if the policy information is policy information determining that files belonging to Tier 2 are to be migrated to Tier 3, the CPU 52 selects Tier 2 as the migration source tier and Tier 3 as the migration destination tier, and if migration target files are migrated from Tier 2 to Tier 3, data stored in the plurality of Tier 2 pages 106 can be migrated to virtual page 114E, and the data which has been migrated to the virtual page 114E can be migrated to the migration destination Tier 3 virtual page 114G.

If, on the other hand, the policy information is policy information determining that files belonging to Tier 3 are to be migrated to Tier 2, the CPU 52 selects Tier 3 as the migration source tier and Tier 2 as the migration destination tier, and if migration target files are migrated from Tier 3 to Tier 2, data stored in the plurality of Tier 3 pages 106 can be migrated to virtual page 114H, and the data which has been migrated to the virtual page 114H can be migrated to the migration destination Tier 2 virtual page 114F.

Similarly, if the policy information is policy information determining that files belonging to Tier 2 are to be migrated to Tier 1, the CPU 52 selects Tier 2 as the migration source tier and Tier 1 as the migration destination tier, and if migration target files are migrated from Tier 2 to Tier 1, data stored in the plurality of Tier 2 pages 106 can be migrated to virtual page 114D, and the data which has been migrated to the virtual page 114D can be migrated to the migration destination Tier 1 virtual page 114B.

Furthermore, either one of the virtual pages 114A and 114B can be used as an upgrade virtual page or downgrade virtual page, and any one of the virtual pages 114C, 114D, 114E, and 114F can also be used as an upgrade virtual page or downgrade virtual page. In addition, either one of the virtual pages 114G and 114H can also be used as an upgrade virtual page or downgrade virtual page.

REFERENCE SIGNS LIST

10 User terminal
12 Information terminal
14 Storage system
18, 20 File server
24, 26 Storage apparatus
28 CPU
30, 38 Memory
46 File system
48 File management software
50 File migration software
52 CPU
56 Memory
66, 68, 72 Storage
100 File management information
102, 104 Physical volume
106 Page
108 Virtual volume
114 Virtual page

The invention claimed is:

1. A storage system, comprising:
a plurality of storage apparatuses which include storage devices of a plurality of types of varying processing performance;
a plurality of file servers configured to manage a plurality of physical volumes which are configured hierarchized in a plurality of tiers in correspondence with the storage devices of a plurality of types and which volumes are constructed on storage areas of each of the storage apparatuses, the physical volumes being managed as data storage areas of tiered file systems that are obtained by integrating and virtually configuring file groups, and which file servers are configured to manage the tiered file systems as access targets of access request sources and to control migration pertaining to files which belong to the tiered file systems on the basis of policy information which determines migration conditions for files which belong to the tiered file systems; and
a storage controller configured to store the file groups in association with the plurality of tiers in virtual volumes obtained by virtualizing the plurality of physical volumes, manage the virtual volumes as access targets of each of the file servers, and control data input/output processing to/from each of the storage apparatuses in response to instructions from each of the file servers,
wherein the file servers are each connected to one another via a first network and the storage apparatuses are each connected to one another via a second network,
wherein the migration source file server of the plurality of file servers is configured to specify, as a target file, a file which is a target of the migration from the tiered file systems on the basis of the policy information, instruct the storage controller to migrate the specified target file, update file management information for managing data and attributes of the specified target file in accordance with information indicating the migration destination of the specified target file, and transmit the updated file management information to the migration destination file server via the first network, wherein the storage controller is configured, in response to the instruction from the migration source file server, to select the target file from the file groups stored in the virtual volume, migrate the selected target file from a tier which is configured as the migration source tier in the policy information and which is the tier to which the target file belongs, to a tier which is configured as the migration destination tier in the policy information, and migrate data of the selected target file from the physical volume of the migration source tier to the physical volume of the migration destination, and wherein the storage controller is further configured to divide each of the storage areas of the plurality of physical volumes into a plurality of blocks, manage each of the divided blocks as a plurality of pages corresponding to each of the physical volumes, manacle the plurality of pages corresponding to each of the physical volumes as data storage areas for storing the data of each of the files, and manage a specified page, for temporarily storing data from the plurality of pages which correspond to each of the physical volumes, in association with each of the physical volumes as a virtual page; and, if the selected target file is migrated from the migration source tier to the migration destination tier, to migrate data stored in a plurality of pages corresponding to the physical volume of the migration source tier to a virtual page corresponding to the physical volume of the migration source tier, copy the data which has been migrated to the virtual page corresponding to the physical volume of the migration source tier to the virtual page corresponding to the physical volume of the migration destination tier, and migrate the data which has been copied to the virtual page corresponding to the physical volume of the migration destination tier to a plurality of pages corresponding to the physical volume of the migration destination tier.

2. The storage system according to claim 1, wherein the storage controller is further configured such that, if the selected target file is migrated from the migration source tier to the migration destination tier, the storage controller migrates the data which has been migrated to the virtual page corresponding to the physical volume of the migration source tier to the physical volume of the migration destination tier.

3. The storage system according to claim 1, wherein the storage controller is further configured such that, if the selected target file is migrated from the migration source tier to the migration destination tier, the storage controller migrates the data which has been migrated to the virtual page corresponding to the physical volume of the migration source tier to the virtual page corresponding to the physical volume of the migration destination tier.

4. The storage system according to claim 1, wherein the storage controller wherein the storage controller is further configured such that, if the policy information is policy information with which the plurality of tiers are divided into an upper tier and a lower tier in accordance with the level of processing performance and with which policy information a file belonging to the upper tier is migrated to the lower tier, the storage controller selects the upper tier as the migration source tier and selects the lower tier as the migration destination tier, and wherein the storage controller is further configured such that, if the selected target file is migrated from the upper tier of the migration source to the lower tier of the migration destination, the storage controller migrates data stored in a plurality of pages corresponding to the physical volume of the migration source upper tier to a virtual page corresponding to the physical volume of the migration source upper tier, and migrates the data which has been migrated to the virtual page corresponding to the physical volume of the migration source upper tier to the virtual page corresponding to the physical volume of the migration destination lower tier.

5. The storage system according to claim 1, wherein the storage controller is further configured such that, if the policy information is policy information with which the plurality of tiers are divided into an upper tier and a lower tier in accordance with the level of processing performance and with which policy information a file belonging to the lower tier is migrated to the upper tier, the storage controller selects the lower tier as the migration source tier and selects the upper tier as the migration destination tier, and wherein the storage controller is further configured such that, if the selected target file is migrated from the lower tier of the migration source to the upper tier of the migration destination, the storage controller migrates data stored in a plurality of pages corresponding to the physical volume of the migration source lower tier to a virtual page corresponding to the physical volume of the migration source lower tier, and migrates the data which has been migrated to the virtual page corresponding to the physical volume of the migration source lower tier to the virtual page corresponding to the physical volume of the migration destination upper tier.

6. The storage system according to claim 1, wherein the storage controller is further configured such that, the storage controller arranges a first downgrade virtual page as the virtual page in the physical volume corresponding to the upper tier, arranges a second downgrade virtual page as the virtual page in the physical volume corresponding to the middle tier, and arranges a third downgrade virtual page as the virtual page in the physical volume corresponding to the lower tier, wherein the storage controller is further configured such that, if the policy information is policy information with which the plurality of tiers are divided into an upper tier, a middle tier, and a lower tier in accordance with the level of processing performance and with which policy information a file belonging to the upper tier is migrated to the middle tier, the storage controller selects the upper tier as the migration source tier and selects the middle tier as the migration destination tier, wherein the storage controller is further configured such that, if the selected target file is migrated from the upper tier of the migration source to the middle tier of the migration destination, the storage controller migrates data stored in a plurality of pages corresponding to the physical volume of the migration source upper tier to the first downgrade virtual page, and migrates the data which has been migrated to the first downgrade virtual page to the second downgrade virtual page corresponding to the physical volume of the migration destination middle tier, wherein the storage controller is further configured such that, if the policy information is policy information with which the plurality of tiers are divided into an upper tier, a middle tier, and a lower tier in accordance with the level of processing performance and with which policy information a file belonging to the middle tier is migrated to the lower tier, the storage controller selects the middle tier as the migration source tier and selects the lower tier as the migration destination tier, and wherein the storage controller is further configured such that, if the selected target file is migrated from the middle tier of the migration source to the lower tier of the migration destination, the storage controller migrates data stored in a plurality of pages corresponding to the physical volume of the migration source middle tier to the second downgrade virtual page, and migrates the data which has been migrated to the second downgrade virtual page to a third downgrade virtual page corresponding to the physical volume of the migration destination lower tier.

7. The storage system according to claim 1, wherein the storage controller is further configured such that, if the plurality of physical volumes are configured from storage devices of three types and the plurality of tiers are divided into an upper tier, a middle tier, and a lower tier in accordance with the level of processing performance, the storage controller the storage controller arranges a first upgrade virtual page as the virtual page in the physical volume corresponding to the upper tier, arranges a second upgrade virtual page as the virtual page in the physical volume corresponding to the middle tier, and arranges a third upgrade virtual page as the virtual page in the physical volume corresponding to the lower tier, and wherein the storage controller is further configured such that, if the policy information is policy information with which the plurality of tiers are divided into an upper tier, a middle tier, and a lower tier in accordance with the level of processing performance and with which policy information a file belonging to the lower tier is migrated to the middle tier, the storage controller selects the lower tier as the migration source tier and selects the middle tier as the migration destination tier, wherein the storage controller is further configured such that, if the selected target file is migrated from the lower tier of the migration source to the middle tier of the migration destination, the storage controller migrates data stored in a plurality of pages corresponding to the physical volume of the migration source lower tier to the third upgrade virtual page, and migrates the data which has been migrated to the third upgrade virtual page to the second upgrade virtual page corresponding to the physical volume of the migration destination middle tier, wherein the storage controller is further configured such that, if the policy information is policy information with which the plurality of tiers are divided into an upper tier, a middle tier, and a lower tier in accordance with the level of processing performance and with which policy information a file belonging to the middle tier is migrated to the upper tier, the storage controller selects the middle tier as the migration source tier and selects the upper tier as the migration destination tier, and wherein the storage controller is further configured such that, if the selected target file is migrated from the middle tier of the migration source to the upper tier of the migration destination, the storage controller migrates data stored in a plurality of pages corresponding to the physical volume of the migration source middle tier to the second upgrade virtual page, and migrates the data which has been migrated to the second upgrade virtual page to the first upgrade virtual page corresponding to the physical volume of the migration destination upper tier.

8. The storage system according to claim 1, wherein the storage controller is further configured such that, if the plurality of physical volumes are configured from storage devices of three types and the plurality of tiers are divided into an upper tier, a middle tier, and a lower tier in accordance with the level of processing performance, the storage controller arranges, as the virtual pages in the physical volume corresponding to the upper tier, a first virtual page for temporarily storing a plurality of data stored in the physical volume corresponding to the upper tier in order to migrate the plurality of data from the upper tier to the middle tier, and a second virtual page for temporarily storing a plurality of data which is migrated from the middle tier to the upper tier, arranges, as the virtual pages in the physical volume corresponding to the middle tier, a third virtual page for temporarily storing a plurality of data which is migrated from the upper tier to the middle tier, a fourth virtual page for temporarily storing a plurality of data stored in the physical volume corresponding to the middle tier in order to migrate the plurality of data from the middle tier to the upper tier, a fifth virtual page for temporarily storing a plurality of data stored in the physical volume corresponding to the middle tier in order to migrate the plurality of data from the middle tier to the lower tier, and a sixth virtual page for temporarily storing a plurality of data which is migrated from the lower tier to the middle tier, and arranges, as the virtual pages in the physical volume corresponding to the lower tier, a seventh virtual page for temporarily storing a plurality of data which is migrated from the middle tier to the lower tier, and an eighth virtual page for temporarily storing a plurality of data stored in the physical volume corresponding to the lower tier in order to migrate the plurality of data from the lower tier to the middle tier, wherein the storage controller is further configured such that, if the policy information is policy information with which the plurality of tiers are divided into an upper tier, a middle tier, and a lower tier in accordance with the level of processing performance and with which policy information a file belonging to the upper tier is migrated to the middle tier, the storage controller selects the upper tier as the migration source tier and selects the middle tier as the migration destination tier, wherein the storage controller is further configured such that, if the selected target file is migrated from the upper tier of the migration source to the middle tier of the migration destination, the storage controller migrates data stored in a plurality of pages corresponding to the physical volume of the migration source upper tier to the first virtual page, and migrates the data which has been migrated to the first virtual page to the third virtual page corresponding to the physical volume of the migration destination middle tier, wherein the storage controller is further configured such that, if the policy information is policy information with which the plurality of tiers are divided into an upper tier, a middle tier, and a lower tier in accordance with the level of processing performance and with which policy information a file belonging to the middle tier is migrated to the lower tier, the storage controller selects the middle tier as the migration source tier and selects the lower tier as the migration destination tier, and wherein the storage controller is further configured such that, if the selected target file is migrated from the middle tier of the migration source to the lower tier of the migration destination, the storage controller migrates data stored in a plurality of pages corresponding to the physical volume of the migration source middle tier to the fifth virtual page, and migrates the data which has been migrated to the fifth virtual page to the seventh virtual page corresponding to the physical volume of the migration destination lower tier.

9. The storage system according to claim 1,
wherein the storage controller is further configured such that, if the plurality of physical volumes are configured from storage devices of three types and the plurality of tiers are divided into an upper tier, a middle tier, and a lower tier in accordance with the level of processing performance, the storage controller arranges, as the virtual pages in the physical volume corresponding to the upper tier, a first virtual page for temporarily storing a plurality of data stored in the physical volume corresponding to the upper tier in order to migrate the plurality of data from the upper tier to the middle tier, and a second virtual page for temporarily storing a plurality of data which is migrated from the middle tier to the upper tier, arranges, as the virtual pages in the physical volume corresponding to the middle tier, a third virtual page for temporarily storing a plurality of data which is migrated from the upper tier to the middle tier, a fourth virtual page for temporarily storing a plurality of data stored in the physical volume corresponding to the middle tier in order to migrate the plurality of data from the middle tier to the upper tier, a fifth virtual page for temporarily storing a plurality of data stored in the physical volume corresponding to the middle tier in order to migrate the plurality of data from the middle tier to the lower tier, and a sixth virtual page for temporarily storing a plurality of data which is migrated from the lower tier to the middle tier, and arranges, as the virtual pages in the physical volume corresponding to the lower tier, a seventh virtual page for temporarily storing a plurality of data which is migrated from the middle tier to the lower tier, and an eighth virtual page for temporarily storing a plurality of data stored in the physical volume corresponding to the lower tier in order to migrate the plurality of data from the lower tier to the middle tier,
wherein the storage controller is further configured such that, if the policy information is policy information with which the plurality of tiers are divided into an upper tier, a middle tier, and a lower tier in accordance with the level of processing performance and with which policy information a file belonging to the lower tier is migrated to the middle tier, the storage controller selects the lower tier as the migration source tier and selects the middle tier as the migration destination tier,
wherein the storage controller is further configured such that, if the selected target file is migrated from the lower tier of the migration source to the middle tier of the migration destination, the storage controller migrates data stored in a plurality of pages corresponding to the physical volume of the migration source lower tier to the eighth virtual page, and migrates the data which has been migrated to the eighth virtual page to the sixth virtual page corresponding to the physical volume of the migration destination middle tier,
wherein the storage controller is further configured such that, if the policy information is policy information with which the plurality of tiers are divided into an upper tier, a middle tier, and a lower tier in accordance with the level of processing performance and with which policy information a file belonging to the middle tier is migrated to the upper tier, the storage controller selects the middle tier as the migration source tier and selects the upper tier as the migration destination tier, and
wherein the storage controller is further configured such that, if the selected target file is migrated from the middle tier of the migration source to the upper tier of the migration destination, the storage controller migrates data stored in a plurality of pages corresponding to the physical volume of the migration source middle tier to the fourth virtual page, and the storage controller migrates the data which has been migrated to the fourth virtual page to the second virtual page corresponding to the physical volume of the migration destination upper tier.

10. A method of controlling a storage system that comprises a plurality of storage apparatuses which include storage devices of a plurality of types of varying processing performance; a plurality of file servers configured to manage a plurality of physical volumes which are configured hierarchized in a plurality of tiers in correspondence with the storage devices of a plurality of types and which volumes are constructed on storage areas of each of the storage apparatuses, the physical volumes being managed as data storage areas of tiered file systems that are obtained by integrating and virtually configuring file groups, and which file servers are configured to manage the tiered file systems as access targets of access request sources and to control migration pertaining to files which belong to the tiered file systems on the basis of policy information which determines migration conditions for files which belong to the tiered file systems; and a storage controller configured to store the file groups in association with the plurality of tiers in virtual volumes obtained by virtualizing the plurality of physical volumes, manage the virtual volumes as access targets of each of the file servers, and control data input/output processing to/from each of the storage apparatuses in response to instructions from each of the file servers, wherein the file servers are each connected to one another via a first network and the storage apparatuses are each connected to one another via a second network,
wherein the method of controlling a storage system comprises:
the migration source file server of the plurality of file servers specifying, as a target file, a file serving as a target of the migration from the tiered file systems on the basis of the policy information, instructing the storage controller to migrate the specified target file, updating file management information for managing data and attributes of the specified target file in accordance with information indicating the migration destination of the specified target file, and transmitting the updated file management information to the migration destination file server via the first network,
the storage controller selecting the target file from the file groups stored in the virtual volumes in response to the instruction from the migration source file server, migrating the selected target file from a tier which is configured as the migration source tier in the policy information and which is the tier to which the target file belongs, to a tier which is configured as the migration destination tier in the policy information, and migrating data of the selected target file from the physical volume of the migration source tier to the physical volume of the migration destination tier;
the storage controller dividing each of the storage areas of the plurality of physical volumes into a plurality of blocks and manages each of the divided blocks as a plurality of pages corresponding to each of the physical volumes, managing the plurality of pages corresponding to each of the physical volumes as data storage areas for storing the data of each of the files, and managing a specified page for temporarily storing data from the plurality of pages corresponding to each of the physical volumes in association with each of the physical volumes as virtual pages, and if the selected target file is migrated from the migration source tier to the migration destination tier, the storage controller migrating data stored in a plurality of pages corresponding to the physical volume of the migration source tier to the virtual page corresponding to the physical volume of the migration source tier, copying the data which is migrated to the virtual page corresponding to the physical volume of the migration source tier to the virtual page corresponding to the physical volume of the migration destination tier, and migrating the data which has been copied to the virtual page corresponding to the physical volume of the migration destination tier to a plurality of pages corresponding to the physical volume of the migration destination tier.

11. The method of controlling a storage system according to claim 10, further comprising:

if the selected target file is migrated from the migration source tier to the migration destination tier, the storage controller migrating data stored in a plurality of pages corresponding to the physical volume of the migration source tier to the virtual page corresponding to the physical volume of the migration source tier, and migrating the data which has been migrated to the virtual page corresponding to the physical volume of the migration source tier to the physical volume of the migration destination tier.

12. The method of controlling a storage system according to claim 10, further comprising:

wherein, if the selected target file is migrated from the migration source tier to the migration destination tier, the storage controller migrating data stored in a plurality of pages corresponding to the physical volume of the migration source tier to the virtual page corresponding to the physical volume of the migration source tier, and migrating the data which has been migrated to the virtual page corresponding to the physical volume of the migration source tier to a virtual page corresponding to the physical volume of the migration destination tier.

13. The method of controlling a storage system according to claim 10, further comprising:

if the policy information is policy information with which the plurality of tiers are divided into an upper tier and a lower tier in accordance with the level of processing performance and with which policy information a file belonging to the upper tier is migrated to the lower tier, the storage controller selecting the upper tier as the migration source tier and selecting the lower tier as the migration destination tier, and if the selected target file is migrated from the upper tier of the migration source to the lower tier of the migration destination, the storage controller migrating data stored in a plurality of pages corresponding to the physical volume of the migration source upper tier to the virtual page corresponding to the physical volume of the migration source upper tier, and migrating the data which has been migrated to the virtual page corresponding to the physical volume of the migration source upper tier to a virtual page corresponding to the physical volume of the lower tier of the migration destination.

* * * * *